United States Patent
Groen et al.

(10) Patent No.: US 6,713,946 B2
(45) Date of Patent: Mar. 30, 2004

(54) LIQUID CRYSTAL PICTURE SCREEN WITH IMPROVED BACKLIGHTING

(75) Inventors: Wilhelm Albert Groen, Einighausen (NL); Knuth Albertsen, Goch (DE); Bernd Rausenberger, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/158,430

(22) Filed: May 30, 2002

(65) Prior Publication Data

US 2002/0195927 A1 Dec. 26, 2002

(30) Foreign Application Priority Data

Jun. 1, 2001 (DE) .......................... 101 26 958

(51) Int. Cl.$^7$ .................... H05B 41/00; H01J 65/00
(52) U.S. Cl. .................. 313/234; 313/607; 313/594
(58) Field of Search ........................ 313/498, 509, 313/221, 50, 567, 234, 607, 594; 368/84; 205/171; 349/30; 428/210; 347/17; 315/214 R; 501/139

(56) References Cited

U.S. PATENT DOCUMENTS

| | | | | |
|---|---|---|---|---|
| 3,649,864 A | * | 3/1972 | Willemsen .................. 313/622 |
| 4,208,869 A | * | 6/1980 | Hanaoka ...................... 368/84 |
| 4,520,294 A | * | 5/1985 | Iida et al. ..................... 315/50 |
| 5,359,261 A | * | 10/1994 | Kondo et al. ................ 313/509 |
| 5,482,614 A | * | 1/1996 | Kondo et al. ................ 205/171 |
| 5,512,799 A | * | 4/1996 | Waymouth .................. 313/567 |
| 5,760,853 A | * | 6/1998 | Yamashita ................... 349/30 |
| 6,069,446 A | * | 5/2000 | Kim .............................. 313/582 |
| 6,084,360 A | * | 7/2000 | Yokokawa et al. ......... 315/287 |
| 6,159,322 A | * | 12/2000 | Ogata et al. ................ 156/230 |
| 6,186,612 B1 | * | 2/2001 | Maeda et al. ................. 347/17 |
| 6,356,037 B1 | * | 3/2002 | Sano et al. ............. 315/241 R |
| 6,380,118 B1 | * | 4/2002 | Harada et al. .............. 501/139 |

* cited by examiner

Primary Examiner—Sandra O'Shea
Assistant Examiner—Dalei Dong

(57) ABSTRACT

A liquid crystal picture screen provided with a backlight system which comprises at least one gas discharge lamp and at least one capacitive coupling system with a dielectric material with the composition $[A'^{n1+}_{a1} A''^{n2+}_{a2} \ldots A^{n'}{}^{nn+}_{an}] [B'^{m1+}_{b1} B''^{m2+}_{b2} \ldots B^{m'}{}^{mn+}_{bm}]O_3$, wherein the cations $A'^{n1+}_{a1} A''^{n2+}_{a2} \ldots A^{n'}{}^{nn+}_{an}$ comprise at least one or several of the cations chosen from the group of $Ba^{2+}$, $Pb^{2+}$, $Sr^{2+}$ and $Ca^{2+}$, as well as possibly one or several of the cations chosen from the group of $Cs^{1+}$, $Rb^{1+}$, $Tl^{1+}$, $K^{1+}$, $Pb^{2+}$, $Ag^{1+}$, $Sr^{2+}$, $Na^{1+}$, $Bi^{3+}$, $La^{3+}$, $Mg^{2+}$, $Zn^{2+}$, $Ca^{2+}$, $Ce^{3+}$, $Cd^{2+}$, $Pr^{3+}$, $Nd^{3+}$, $Eu^{3+}$, $Gd^{3+}$ and $Sm^{3+}$, and the cations $B'^{m1+}_{b1} B''^{m2+}_{b2} \ldots B^{m'}{}^{mn+}_{bm}$ comprise at least one or several of the cations chosen from the group of $Ti^{4+}$, $Zr^{4+}$ and $Sn^{4+}$ as well as possibly one or several of the cations chosen from the group of $Mn^{2+}$, $Cr^{2+}$, $In^{3+}$, $V^{2+}$, $Fe^{2+}$, $Pb^{4+}$, $Li^{1+}$, $Co^{2+}$, $Sc^{3+}$, $Zn^{2+}$, $Cu^{2+}$, $U^{6+}$, $Mg^{2+}$, $Hf^{4+}$, $Mo^{3+}$, $Ni^{2+}$, $Nb^{4+}$, $Ti^{3+}$, $W^{4+}$, $Mo^{4+}$, $Fe^{3+}$, $Mn^{3+}$, $V^{3+}$, $Re^{4+}$, $Ir^{4+}$, $Ru^{4+}$, $W^{5+}$, $Ta^{5+}$, $Cr^{3+}$, $Ga^{3+}$, $Co^{3+}$, $Mo^{5+}$, $Ni^{3+}$, $Sb^{5+}$, $W^{6+}$, $Nb^{5+}$, $Mo^{6+}$, $Fe^{4+}$, $Re^{5+}$, $V^{4+}$, $Te^{6+}$, $V^{5+}$, $Cu^{3+}$, $Al^{3+}$, $Mn^{4+}$, $Ge^{4+}$, $Y^{3+}$, $Gd^{3+}$, $Dy^{3+}$, $Ho^{3+}$, $Er^{3+}$, $Yb^{3+}$, $Tb^{3+}$ and $Lu^{3+}$, with $0.98 \leq a_1 + a_2 + \ldots + a_n \leq 1.02$,
$0.98 \leq b_1 + b_2 + \ldots + b_m \leq 1.02$,
$a_1 + a_2 + \ldots + a_n + b_1 + b_2 + \ldots + b_m \leq 2$,
$a_1 * n^1 + a_2 * n^2 + \ldots + a_n * n^n + b_1 * m^1 + b_2 * m^2 + \ldots + b_m * m^m \leq 6$.

7 Claims, 1 Drawing Sheet

… … …

LIQUID CRYSTAL PICTURE SCREEN WITH IMPROVED BACKLIGHTING

BACKGROUND OF THE INVENTION

1. Field of the Invention

The invention relates to liquid crystal picture screen provided with a backlight system which comprises at least one gas discharge lamp with a discharge vessel and at least one capacitive coupling means with a dielectric material. The invention further relates to a backlight system with at least one gas discharge lamp and to a gas discharge lamp.

2. Description of Related Art

Liquid crystal picture screens are passive display systems, i.e. they do not themselves radiate light. These picture screens are based on the principle that light does or does not pass through the layer of liquid crystals. This means that an external light source is required for generating a picture. The ambient light is utilized as an external light source in reflective liquid crystal picture screens. In the case of transmissive liquid crystal picture screens, artificial light is generated in a backlight system.

Backlight systems may comprise a gas discharge lamp as the light source. Besides the generation of electrons at so-called hot electrodes through glow emission, the gas discharge may also be caused by emission of electrons in a strong electric field or directly through ion bombardment (ion-induced secondary emission). In a capacitive mode of operation, capacitive coupling means are used as the electrodes. These capacitive coupling means are formed from a dielectric material which is in contact with the discharge gas at one side and which is connected with electrical conduction to an external current circuit at the other side. An AC voltage applied to the capacitive coupling means generates an electric AC field in the discharge vessel in which the electrons move and excite a gas discharge in a known manner.

Such a gas discharge lamp is known from DE 199 15 616, in which a sintered ferroelectric material is used as the coupling means instead of the usual metal electrodes. The sintered ferroelectric material used was preferably $Ba(Ti_{0.91}Zr_{0.09})O_3$ doped with certain donor/acceptor combinations. The material described has a high dielectric constant and a rectangular hysteresis loop.

It is a disadvantage of the materials used that they are coarse-grained. As a consequence the capacitive coupling means has a reduced mechanical strength. A further disadvantage is that the Curie temperature of the ferroelectric material is very low, at 80° C., so that the operating temperature of the lamp is very low.

BRIEF SUMMARY OF INVENTION

It is accordingly an object of the invention to circumvent the disadvantages of the present state of the art and to provide a liquid crystal picture screen with an improved backlighting, in particular with an improved light source.

This object is achieved by means of a liquid crystal picture screen provided with a backlight system which comprises at least one gas discharge lamp with a discharge vessel and at least one capacitive coupling means with a dielectric material with the composition $[A'^{n1+}_{a1} A''^{n2+}_{a2} \ldots A^{n'\,nn+}_{an}] [B'^{m1+}_{b1} B''^{m2+}_{b2} \ldots B^{m'\,mn+}_{bm}]O_3$, wherein the cations $A'^{n1+}_{a1} A''^{n2+}_{a2} \ldots A^{n'\,nn+}_{an}$ comprise at least one or several of the cations chosen from the group of $Ba^{2+}$, $Pb^{2+}$, $Sr^{2+}$ and $Ca^{2+}$, as well as possibly one or several of the cations chosen from the group of $Cs^{1+}$, $Rb^{1+}$, $Tl^{1+}$, $K^{1+}$, $Pb^{2+}$, $Ag^{1+}$, $Sr^{2+}$, $Na^{1+}$, $Bi^{3+}$, $La^{3+}$, $Mg^{2+}$, $Zn^{2+}$, $Ca^{2+}$, $Ce^{3+}$, $Cd^{2+}$, $Pr^{3+}$, $Nd^{3+}$, $Eu^{3+}$, $Gd^{3+}$ and $Sm^{3+}$, and the cations $B'^{m1+}_{b1} B''^{m2+}_{b2} \ldots B^{m'\,mn+}_{bm}$ comprise at least one or several of the cations chosen from the group of $Ti^{4+}$, $Zr^{4+}$ and $Sn^{4+}$ as well as possibly one or several of the cations chosen from the group of $Mn^{2+}$, $Cr^{2+}$, $In^{3+}$, $V^{2+}$, $Fe^{2+}$, $Pb^{4+}$, $Li^{1+}$, $Co^{2+}$, $Sc^{3+}$, $Zn^{2+}$, $Cu^{2+}$, $U^{6+}$, $Mg^{2+}$, $Hf^{4+}$, $Mo^{3+}$, $Ni^{2+}$, $Nb^{4+}$, $Ti^{3+}$, $W^{4+}$, $Mo^{4+}$, $Fe^{3+}$, $Mn^{3+}$, $V^{3+}$, $Re^{4+}$, $Ir^{4+}$, $Ru^{4+}$, $W^{5+}$, $Ta^{5+}$, $Cr^{3+}$, $Ga^{3+}$, $Co^{3+}$, $Mo^{5+}$, $Ni^{3+}$, $Sb^{5+}$, $W^{6+}$, $Nb^{5+}$, $Mo^{6+}$, $Fe^{4+}$, $Re^{5+}$, $V^{4+}$, $Te^{6+}$, $V^{5+}$, $Cu^{3+}$, $Al^{3+}$, $Mn^{4+}$, $Ge^{4+}$, $Y^{3+}$, $Gd^{3+}$, $Dy^{3+}$, $Ho^{3+}$, $Er^{3+}$, $Yb^{3+}$, $Tb^{3+}$ and $Lu^{3+}$, with $0.98 \leq a_1 + a_2 + \ldots + a_n \leq 1.02$,
$0.98 \leq b_1 + b_2 + \ldots + b_m \leq 1.02$,
$a_1 + a_2 + \ldots + a_n + b_1 + b_2 + \ldots + b_m \leq 2$,
$a_1 * n^1 + a_2 * n^2 + \ldots + a_n * n^n + b_1 * m^1 + b_2 * m^2 + \ldots + b_m * m^m \leq 6$.

A liquid crystal picture screen with improved characteristics is obtained through the use of the dielectric materials according to the invention in the capacitive coupling means of the gas discharge lamp. The materials according to the invention can be manufactured with comparatively small dimensions ($\leq 20\,\mu m$). The capacitive coupling means comprising a dielectric material according to the invention as a result has a greater mechanical strength and is accordingly clearly more durable. The improved breakdown resistance renders it possible to manufacture a capacitive coupling means with a smaller layer thickness. A further advantage is that the dielectric materials show a smaller cathode fall, i.e. lower losses in the coupling of the current into the gas discharge lamp, in comparison with the prior art mentioned above. All in all, a more efficient gas discharge lamp is obtained thereby. A further advantage is that the dielectric materials according to the invention join themselves more securely to glass. This enhances the vacuumtightness of the gas discharge lamp. Furthermore, the dielectric materials according to the invention have a Curie temperature of more than 80° C.

It is preferred that the cations $A'^{n1+}_{a1} A''^{n2+}_{a2} \ldots A^{n'\,nn+}_{an}$ comprise $Ba^{2+}$ and the cations $B'^{m1+}_{b1} B''^{m2+}_{b2} \ldots B^{m'\,mn+}_{bm}$ comprise $Nb^{5+}$, $Co^{2+}$ and $Mn^{3+}$.

A capacitive coupling means with this dielectric material distinguishes itself by a high strength, a low cathode fall, and a Curie temperature of 125° C.

It may furthermore be preferred that the capacitive coupling means in addition comprises a sintering aid.

It is particularly highly preferred that said sintering aid is $SiO_2$.

The manufacture of the capacitive coupling means is improved by sintering aids. The sintering aid may in addition have a positive influence on the properties of the dielectric material and thus of the coupling means.

It is particularly highly preferred that the cations $A'^{n1+}_{a1} A''^{n2+}_{a2} \ldots A^{n'\,nn+}_{an}$ comprise $Ba^{2+}$ and $Mg^{2+}$, the cations $B'^{m1+}_{b1} B''^{m2+}_{b2} \ldots B^{m'\,mn+}_{bm}$ comprise $Y^{3+}$, $W^{6+}$, $Mo^{6+}$ and $Mn^{2+}$, and the additional compound is $SiO_2$.

A capacitive coupling means with this dielectric material distinguishes itself by a high strength, a low cathode fall, and a Curie temperature of 125° C.

The invention further relates to a backlight system which comprises at least one gas discharge lamp as well as to a gas discharge lamp with a discharge vessel and at least one capacitive coupling means with a dielectric material having the composition:

$[A'^{n1+}_{a1} A''^{n2+}_{a2} \ldots A^{n'^{n+}}_{an}] [B'^{m1+}_{b1} B''^{m2+}_{b2} \ldots B^{m'^{mn+}}_{bm}]O_3$, wherein the cations $A'^{n1+}_{a1} A''^{n2+}_{a2} \ldots A^{n'^{n+}}_{an}$ comprise at least one or several of the cations chosen from the group of $Ba^{2+}$, $Pb^{2+}$, $Sr^{2+}$ and $Ca^{2+}$, as well as possibly one or several of the cations chosen from the group of $Cs^{1+}$, $Rb^{1+}$, $Tl^{1+}$, $K^{1+}$, $Pb^{2+}$, $Ag^{1+}$, $Sr^{2+}$, $Na^{1+}$, $Bi^{3+}$, $La^{3+}$, $Mg^{2+}$, $Zn^{2+}$, $Ca^{2+}$, $Ce^{2+}$, $Cd^{2+}$, $Pr^{3+}$, $Nd^{3+}$, $Eu^{3+}$, $Gd^{3+}$ and $Sm^{3+}$, and the cations $B'^{m1+}_{b1} B''^{m2+}_{b2} \ldots B^{m'^{mn+}}_{bm}$ comprise at least one or several of the cations chosen from the group of $Ti^{4+}$, $Zr^{4+}$ and $Sn^{4+}$ as well as possibly one or several of the cations chosen from the group of $Mn^{2+}$, $Cr^{2+}$, $In^{3+}$, $V^{2+}$, $Fe^{2+}$, $Pb^{4+}$, $Li^{1+}$, $Co^{2+}$, $Sc^{3+}$, $Zn^{2+}$, $Cu^{2+}$, $U^{6+}$, $Mg^{2+}$, $Hf^{4+}$, $Mo^{3+}$, $Ni^{2+}$, $Nb^{4+}$, $Ti^{3+}$, $W^{4+}$, $Mo^{4+}$, $Fe^{3+}$, $Mn^{3+}$, $V^{3+}$, $Re^{4+}$, $Ir^{4+}$, $Ru^{4+}$, $W^{5+}$, $Ta^{5+}$, $Cr^{3+}$, $Ga^{3+}$, $Co^{3+}$, $Mo^{5+}$, $Ni^{3+}$, $Sb^{5+}$, $W^{6+}$, $Nb^{5+}$, $Mo^{6+}$, $Fe^{4+}$, $Re^{5+}$, $V^{4+}$, $Te^{6+}$, $V^{5+}$, $Cu^{3+}$, $Al^{3+}$, $Mn^{4+}$, $Ge^{4+}$, $Y^{3+}$, $Gd^{3+}$, $Dy^{3+}$, $Ho^{3+}$, $Er^{3+}$, $Yb^{3+}$, $Tb^{3+}$ and $Lu^{3+}$, with $0.98 \leq a_1 + a_2 + \ldots + a_n \leq 1.02$, $0.98 \leq b_1 + b_2 + \ldots + b_m \leq 1.02$, $a_1 + a_2 + \ldots + a_n + b_1 + b_2 + \ldots + b_m \leq 2$, $a_1 * n^1 + a_2 * n^2 + \ldots + a_n * n^n + b_1 * m^1 + b_2 * m^2 + \ldots + b_m * m^m \leq 6$.

BRIEF DESCRIPTION OF THE DRAWINGS

Further particulars, characteristics, and advantages of the invention will become apparent from the ensuing description of preferred embodiments given with reference to drawings, in which.

DETAILED DESCRIPTION OF INVENTION

A liquid crystal picture screen will usually comprise a liquid crystal unit and a backlight system. The liquid crystal unit comprises a first and a second polarizer and a liquid crystal cell which comprises two transparent plates which each support a matrix of light-transmitting electrodes. A liquid crystal material is accommodated between the two transparent plates. The liquid crystal material comprises, for example, TN (twisted nematic) liquid crystals, STN (super twisted nematic) liquid crystals, DSTN (double super twisted nematic) liquid crystals, FSTN (foil super twisted nematic) liquid crystals, VAN (vertically aligned) liquid crystals, or OCB (optically compensated bend) liquid crystals. The liquid crystal cell is sandwiched between the two polarizers, of which the second polarizer is visible to the viewer.

The liquid crystal cell is provided with a color filter for the generation and display of color pictures. The color filter comprises a mosaic arrangement of pixels which each transmit either red, or green, or blue light. The color filter is preferably positioned between the first polarizer and the liquid crystal cell.

The background lighting system may be, for example, a "direct-lit" backlight system or a "side-lit" backlight system, which comprises an optical waveguide and a coupling structure.

Figure 1:
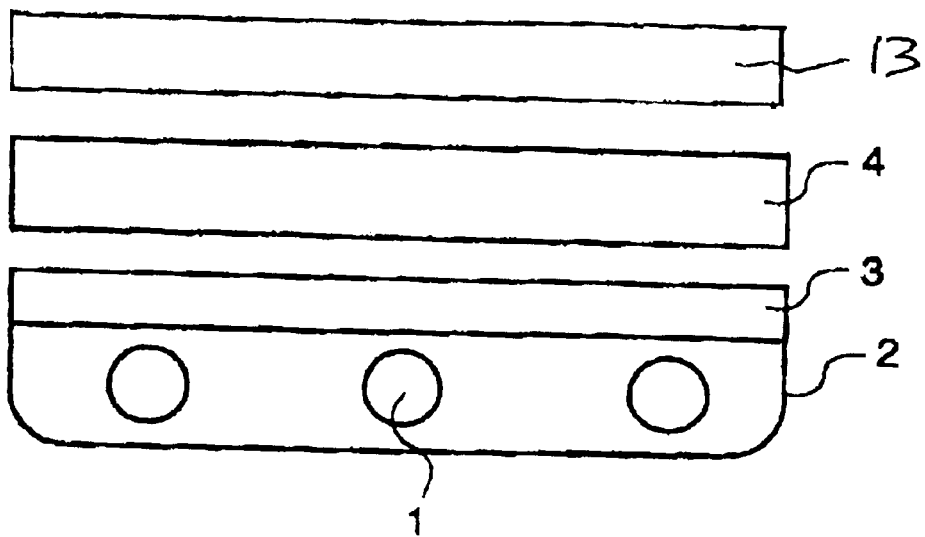
FIG. 1 diagrammatically shows the construction of a background lighting system.

According to FIG. 1, a backlight system comprises a light source 1, which is normally present in housing 2 which preferably comprises a reflector on its inner side. The backlight system may in addition comprise a diffuser plate 3 and a collimator 4. A liquid crystal unit 13 is also shown.

The light source 1, which is a gas discharge lamp with at least one capacitive coupling means 6, preferably emits white or substantially white light.

Figure 2:
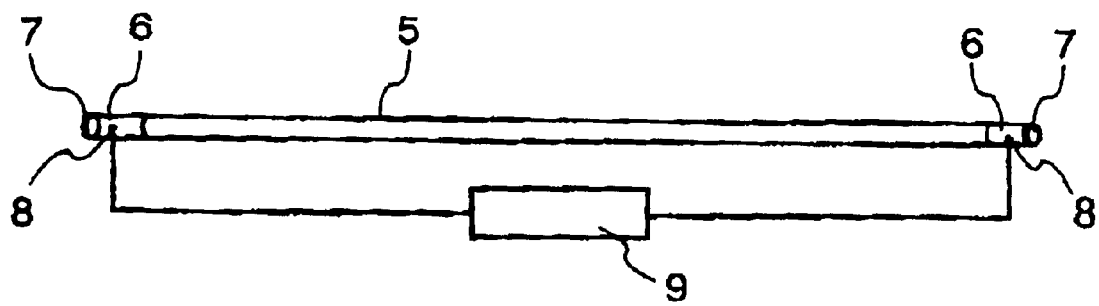
FIG. 2 diagrammatically shows a gas discharge lamp.

FIG. 2 shows a possible embodiment of a gas discharge lamp with two capacitive coupling means. The gas discharge lamp has a glass tube as its discharge vessel 5. The discharge vessel 5 coated on its inside with a phosphor or a combination of phosphors preferably has an internal diameter of 3 mm, an external diameter of 4 mm, and a length of 40 cm, and is filled with 50 mbar Ar and 5 mg Hg. A capacitive coupling means 6 at each end is formed by a respective cylindrical tube of a dielectric material according to the invention. The capacitive coupling means 6 preferably has an external diameter of 4 mm, a wall thickness of 0.5 mm, and a length of 10 mm. The discharge vessel 5 is sealed in a vacuumtight manner to a disc-shaped dielectric cap 7 by the capacitive coupling means 6, which has the same internal diameter, in a fusion process. A layer of silver paste is applied to the outside of each coupling means 6 and baked out so as to serve as an electrical contact 8. The gas discharge lamp is connected to an external supply unit by means of this contact 8. A lamp driver circuit 9 acts as the external supply unit in this example, supplying a current of approximately 30 mA at 40 kHz and at an average voltage of approximately 350 V. The lamp delivers a luminous flux of approximately 600 lumens during stationary operation. The driver circuit 9 furthermore comprises a component capable of delivering 1500 V for short periods for the purpose of igniting the gas discharge lamp. A stable gas discharge establishes itself after ignition. Electrons arrive at the surface of the dielectric material of the capacitive coupling means 6 and stick there, which leads to an increase in the ion-induced secondary emission coefficient γ. The efficacy of the gas discharge lamp is increased thereby.

Figure 3:
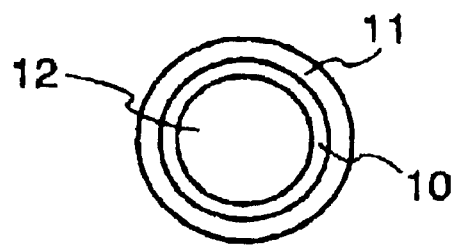
FIG. 3 diagrammatically shows a capacitive coupling means in cross-sectional view.

FIG. 3 diagrammatically shows a capacitive coupling means 6 according to the invention in cross-sectional view. The inner space 12 filled with a filling gas is surrounded by a dielectric layer 10 comprising a dielectric material according to the invention. A metallization layer 11 serving for electrical contacting is provided of the dielectric layer 10. Alternatively, a further, thin dielectric layer may be provided as a protective layer on the dielectric layer 10, i.e. on the side facing the inner space.

Preferably, a mixture is chosen for the filling gas in the discharge vessel 5 which comprises at least one rare gas, or a rare gas and mercury. A plurality of gas mixtures may be used as the filling gas for the lamp according to the invention. In particular, the filling gases used in known low-pressure gas discharge lamps may be used.

Dielectric materials which may be used for the capacitive coupling means 6 are, for example, $BaTiO_3$, $PbTiO_3$, $SrTiO_3$, $CaTiO_3$, $BaZrO_3$, $BaSnO_3$, $PbZrO_3$, $PbSnO_3$, $SrSnO_3$, $SrZrO_3$, $CaZrO_3$, $CaSnO_3$ or mixed crystals of two or more of these compounds. In addition, dielectric materials may be used which comprise $BaTiO_3$, $PbTiO_3$, $SrTiO_3$, $CaTiO_3$, $BaZrO_3$, $BaSnO_3$, $PbZrO_3$, $PbSnO_3$, $SrSnO_3$, $SrZrO_3$, $CaZrO_3$, $CaSnO_3$ or mixed crystals of these compounds, as well as one or several cations chosen from the group of $Cs^{1+}$, $Rb^{1+}$, $Tl^{1+}$, $K^{1+}$, $Pb^{2+}$, $Ag^{1+}$, $Sr^{2+}$, $Na^{1+}$, $Bi^{3+}$, $La^{3+}$, $Mg^{2+}$, $Zn^{2+}$, $Ca^{2+}$, $Ce^{3+}$, $Cd^{2+}$, $Pr^{3+}$, $Nd^{3+}$, $Eu^{3+}$, $Gd^{3+}$, $Sm^{3+}$, $Mn^{2+}$, $Cr^{2+}$, $In^{3+}$, $V^{2+}$, $Fe^{2+}$, $Pb^{4+}$, $Li^{1+}$, $Co^{2+}$, $Sc^{3+}$, $Zn^{2+}$, $Cu^{2+}$, $U^{6+}$, $Hf^{4+}$, $Mo^{3+}$, $Ni^{2+}$, $Nb^{4+}$, $Ti^{3+}$, $W^{4+}$, $Mo^{4+}$, $Fe^{3+}$, $Mn^{3+}$, $V^{3+}$, $Re^{4+}$, $Ir^{4+}$, $Ru^{4+}$, $W^{5+}$, $Ta^{5+}$, $Cr^{3+}$, $Ga^{3+}$, $Co^{3+}$, $Mo^{5+}$, $Ni^{3+}$, $Sb^{5+}$, $W^{6+}$, $Nb^{5+}$, $Mo^{6+}$, $Fe^{4+}$, $Re^{5+}$, $V^{4+}$, $Te^{6+}$, $V^{5+}$, $Cu^{3+}$, $Al^{3+}$, $Mn^{4+}$, $Ge^{4+}$, $Y^{3+}$, $Gd^{3+}$, $Dy^{3+}$, $Ho^{3+}$, $Er^{3+}$, $Yb^{3+}$, $Tb^{3+}$ and $Lu^{3+}$. In addition to these dielectric materials, the capacitive coupling means 6 may comprise also sintering aids. The quantity of added sintering aids preferably lies between 0.01 and 5% by weight in relation to the quantity of dielectric material. Preferably, the capacitive coupling means 6 comprises $SiO_2$ as the added sintering aid.

It is particularly strongly preferred that the capacitive coupling means 6 comprises $BaTiO_3$ doped with $Nb^{5+}$, $Mn^{2+}$ and $Co^{2+}$. A further particularly strongly preferred embodiment envisages that the capacitive coupling means 6 comprises $BaTiO_3$ doped with $Y^{3+}$, $W^{6+}$, $Mo^{6+}$ and $Mn^{2+}$ plus the added sintering aid $SiO_2$. A capacitive coupling means 6 with one of these two dielectric materials distinguishes itself by a high strength, a low cathode fall, and a Curie temperature of 125° C. Compared with a commercially available cold-cathode lamp with metal electrodes, the cathode fall of a gas discharge lamp having $BaTiO_3$ doped with $Nb^{5+}$, $Mn^{2+}$ and $Co^{2+}$ as its coupling means 6 is 20% lower. A gas discharge lamp having $BaTiO_3$ doped with $Y^{3+}$, $W^{6+}$, $Mo^{6+}$ and $Mn^{2+}$ as its capacitive coupling means 6 plus $SiO_2$ as an additional sintering aid has its cathode fall reduced by 40%, as compared with a commercially available cold-cathode lamp with metal electrodes.

What is claimed is:

1. A liquid crystal picture screen provided with a backlight system which comprises at least one gas discharge lamp with a discharge vessel (5) and at least one electrode comprising capacitive coupling means (6) with a dielectric material with the composition.

$[A'^{n1+}_{a1} A''^{n2+}_{a2} \ldots A^{n'}{}^{nn+}_{an}] [B'^{m1+}_{b1} B''^{m2+}_{b2} + \ldots b^{m'}{}^{mn+}_{bm}]O_3$, wherein the cations $A'^{n1+}_{a1} A''^{n2+}_{a2} \ldots A^{n'}{}^{nn+}_{an}$ comprise at least one or several of the cations chosen from the group of $Ba^{2+}$, $Pb^{2+}$, $Sr^{2+}$ and $Ca^{2+}$, as well as possibly one or several of the cations chosen from the group of $Cs^{1+}$, $Rb^{1+}$, $Tl^{1+}$, $K^{1+}$, $Pb^{2+}$, $Ag^{1+}$, $Sr^{2+}$, $Na^{1+}$, $Bi^{3+}$, $La^{3+}$, $Mg^{2+}$, $Zn^{2+}$, $Ca^{2+}$, $Ce^{3+}$, $Cd^{2+}$, $Pr^{3+}$, $Nd^{3+}$, $Eu^{3+}$, $Gd^{3+}$ and $Sm^{3+}$, and the cations $B'^{m1+}_{b1} B''^{m2+}_{b2} \ldots B^{m'}{}^{mn+}_{bm}$ comprise at least one or several of the cations chosen from the group of $Ti^{4+}$, $Zr^{4+}$ and $Sn^{4+}$ as well as possibly one or several of the cations chosen from the group of $Mn^{2+}$, $Cr^{2+}$, $In^{3+}$, $V^{2+}$, $Fe^{2+}$, $Pb^{4+}$, $Li^{1+}$, $Co^{2+}$, $Sc^{3+}$, $Zn^{2+}$, $Cu^{2+}$, $U^{6+}$, $Mg^{2+}$, $Hf^{4+}$, $Mo^{3+}$, $Ni^{2+}$, $Nb^{4+}$, $Ti^{3+}$, $W^{4+}$, $Mo^{4+}$, $Fe^{3+}$, $Mn^{3+}$, $V^{3+}$, $Re^{4+}$, $Ir^{4+}$, $Ru^{4+}$, $W^{5+}$, $Ta^{5+}$, $Cr^{3+}$, $Ga^{3+}$, $Co^{3+}$, $Mo^{5+}$, $Ni^{3+}$, $Sb^{5+}$, $W^{6+}$, $Nb^{5+}$, $Mo^{6+}$, $Fe^{4+}$, $Re^{5+}$, $V^{4+}$, $Te^{6+}$, $V^{5+}$, $Cu^{3+}$, $Al^{3+}$, $Mn^{4+}$, $Ge^{4+}$, $Y^{3+}$, $Gd^{3+}$, $Dy^{3+}$, $Ho^{3+}$, $Er^{3+}$, $Yb^{3+}$, $Tb^{3+}$ and $Lu^{3+}$ with $0.98 \leq a_1 + a_2 + \ldots + a_n \geq 1.02$, $0.98 \leq b_1 + b_2 + \ldots + b_m \geq 1.02$, $a_1 + a_2 + \ldots + a_n + b_1 + b_2 + \ldots + b_m \leq 2$, $a_1 * n^1 + a_2 * n^2 + \ldots + a_n * n^n + b_1 * m^1 + b_2 * m^2 + \ldots + b_m * m^m \leq 6$.

2. A liquid crystal picture screen as claimed in claim 1, characterized in that the capacitive coupling means (6) in addition comprises a sintering aid.

3. A liquid crystal picture screen as claimed in claim 2, characterized in that said sintering aid is $SiO_2$.

4. A backlight system comprising at least one gas discharge lamp with a discharge vessel (5) and at least one electrode comprising capacitive coupling means (6) with a dielectric material with the composition $[A'^{n1+}_{a1} A''^{n2+}_{a2} \ldots A^{n'}{}^{nn+}_{an}] [B'^{m1+}_{b1} B''^{m2+}_{b2} + \ldots B^{m'}{}^{mn+}_{bm}]O_3$, wherein the cations $A'^{n1+}_{a1} A''^{n2+}_{a2} \ldots$ $A^{n'}{}^{nn+}_{an}$ comprise at least one or several of the cations chosen from the group of $Ba^{2+}$, $Pb^{2+}$, $Sr^{2+}$ and $Ca^{2+}$, as well as possibly one or several of the cations chosen from the group of $Cs^{1+}$, $Rb^{1+}$, $Tl^{1+}$, $K^{1+}$, $Pb^{2+}$, $Ag^{1+}$, $Sr^{2+}$, $Na^{1+}$, $Bi^{3+}$, $La^{3+}$, $Mg^{2+}$, $Zn^{2+}$, $Ca^{2+}$, $Ce^{3+}$, $Cd^{2+}$, $Pr^{3+}$, $Nd^{3+}$, $Eu^{3+}$, $Gd^{3+}$ and $Sm^{3+}$, and the cations $B'^{m1+}_{b1} B''^{m2+}_{b2} \ldots B^{m'}{}^{mn+}_{bm}$ comprise at least one or several of the cations chosen from the group of $Ti^{4+}$, $Zr^{4+}$ and $Sn^{4+}$ as well as possibly one or several of the cations chosen from the group of $Mn^{2+}$, $Cr^{2+}$, $In^{3+}$, $V^{2+}$, $Fe^{2+}$, $Pb^{4+}$, $Li^{1+}$, $Co^{2+}$, $Sc^{3+}$, $Zn^{2+}$, $Cu^{2+}$, $U^{6+}$, $Mg^{2+}$, $Hf^{4+}$, $Mo^{3+}$, $Ni^{2+}$, $Nb^{4+}$, $Ti^{3+}$, $W^{4+}$, $Mo^{4+}$, $Fe^{3+}$, $Mn^{3+}$, $V^{3+}$, $Re^{4+}$, $Ir^{4+}$, $Ru^{4+}$, $W^{5+}$, $Ta^{5+}$, $Cr^{3+}$, $Ga^{3+}$, $Co^{3+}$, $Mo^{5+}$, $Ni^{3+}$, $Sb^{5+}$, $W^{6+}$, $Nb^{5+}$, $Mo^{6+}$, $Fe^{4+}$, $Re^{5+}$, $V^{4+}$, $Te^{6+}$, $V^{5+}$, $Cu^{3+}$, $Al^{3+}$, $Mn^{4+}$, $Ge^{4+}$, $Y^{3+}$, $Gd^{3+}$, $Dy^{3+}$, $Ho^{3+}$, $Er^{3+}$, $Yb^{3+}$, $Tb^{3+}$ and $Lu^{3+}$ with $0.98 \leq a_1 + a_2 + \ldots + a_n \geq 1.02$, $0.98 \leq b_1 + b_2 + \ldots + b_m \geq 1.02$, $a_1 + a_2 + \ldots + a_n + b_1 + b_2 + \ldots + b_m \leq 2$, $a_1 * n^1 + a_2 * n^2 + \ldots + a_n * n^n + b_1 * m^1 + \ldots b_2 * m^2 + \ldots + b_m * m^m \leq 6$.

5. A gas discharge lamp with a discharge vessel and at least one electrode comprising capacitive coupling means (6) with a dielectric material with the composition $[A'^{n1+}_{a1} A''^{n2+}_{a2} \ldots A^{n'}{}^{nn+}_{an}] [B'^{m1+}_{b1} B''^{m2}_{b2} + \ldots B^{m'}{}^{mn\downarrow}_{bm}]O_3$, wherein the cations from the group of $Ba^{2+}$, $Pb^{2+}$, $Sr^{2+}$ and $Ca^{2+}$, as well as possibly one or several of the cations chosen from the group of $Cs^{1+}$, $Rb^{1+}$, $Tl^{1+}$, $K^{1+}$, $Pb^{2+}$, $Ag^{1+}$, $Sr^{2+}$, $Na^{1+}$, $Bi^{3+}$, $La^{3+}$, $Mg^{2+}$, $Zn^{2+}$, $Ca^{2+}$, $Ce^{3+}$, $Cd^{2+}$, $Pr^{3+}$, $Nd^{3+}$, $Eu^{3+}$, $Gd^{3+}$ and $Sm^3$, and the cations $B'^{m1+}_{b1} B''^{m2+}_{b2} \ldots B^{m'}{}^{mn+}_{bm}$ comprise at least one or several of the cations chosen from the group of $Ti^{4+}$, $Zr^{4+}$ and $Sn^{4+}$ as well as possibly one or several of the cations chosen from the group of $Mn^{2+}$, $Cr^{2+}$, $In^{3+}$, $V^{2+}$, $Fe^{2+}$, $Pb^{4+}$, $Li^{1+}$, $Co^{2+}$, $Sc^{3+}$, $Zn^{2+}$, $Cu^{2+}$, $U^{6+}$, $Mg^{2+}$, $Hf^{4+}$, $Mo^{3+}$, $Ni^{2+}$, $Nb^{4+}$, $Ti^{3+}$, $W^{4+}$, $Mo^{4+}$, $Fe^{3+}$, $Mn^{3+}$, $V^{3+}$, $Re^{4+}$, $Ir^{4+}$, $Ru^{4+}$, $W^{5+}$, $Ta^{5+}$, $Cr^{3+}$, $Ga^{3+}$, $Co^{3+}$, $Mo^{5+}$, $Ni^{3+}$, $Sb^{5+}$, $W^{6+}$, $Nb^{5+}$, $Mo^{6+}$, $Fe^{4+}$, $Re^{5+}$, $V^{4+}$, $Te^{6+}$, $V^{5+}$, $Cu^{3+}$, $Al^{3+}$, $Mn^{4+}$, $Ge^{4+}$, $Y^{3+}$, $Gd^{3+}$, $Dy^{3+}$, $Ho^{3+}$, $Er^{3+}$, $Yb^{3+}$, $Tb^{3+}$ and $Lu^3+$ with $0.98 \leq a_1 + a_2 + \ldots + a_n \geq 1.02$, $0.98 \leq b_1 + b_2 + \ldots + b_m \geq 1.02$, $a_1 + a_2 + \ldots + a_n + b_1 + b_2 + \ldots + b_m \leq 2$, $a_1 * n^1 + a_2 * n^2 + \ldots + a_n * n^n + b_1 * m^1 + b_2 * m^2 + \ldots + b_m * m^m \leq 6$.

6. A liquid crystal picture screen provided with a backlight system which comprises at least one gas discharge lamp with a discharge vessel (5) and at least one capacitive coupling means (6) with a dielectric material with the composition $[A'^{n1+}_{a1} A''^{n2+}_{a2} \ldots A^{n'}{}^{nn+}_{an}] [B'^{m1+}_{b1} B''^{m2+}_{b2} \ldots B^{m'}{}^{mn\downarrow}_{bm}]O_3$, wherein the cations $A'^{n1+}_{a1} A''^{n2+}_{a2} \ldots A^{n'}{}^{nn+}_{an}$ comprise $B_a^{2+}$, and the cations $B'^{m1+}_{b1} B''^{m2+}_{b2} \ldots B^{m'}{}^{mn+}_{bm}$ comprise $Nb^{5+}$, $Co^{2+}$ and $Mn^{3+}$ with $0.98 \leq a_1 + a_2 + \ldots + a_n \geq 1.02$, $0.98 \leq b_1 + b_2 + \ldots + b_m \geq 1.02$, $a_1 + a_2 + \ldots + a_0 + b_1 + b_2 + \ldots + b_m \leq 2$, $a_1 * n^1 + a_2 * n^2 + \ldots + a_n * n^n + b_1 * m^1 + \ldots b_2 * m^2 + \ldots + b_m * m^m \leq 6$.

7. A liquid crystal picture screen provided with a backlight system which comprises at least one gas discharge lamp with a discharge vessel (5) and at least one capacitive coupling means (6) with a dielectric material with the composition $[A'^{n1+}_{a1} A''^{n2+}_{a2} \ldots A^{n'\,nn+}_{an}] [B'^{m1+}_{b1} B''^{m2+}_{a2} \ldots B^{m'\,mn+}_{bm}]O_3$, wherein the cations $A'^{n1+}_{a1} A''^{n2+}_{a2} \ldots A^{n'\,nn+}_{an}$ comprise $Ba^{2+}$ and $Mg^{2+}$, and the cations $B'^{m1+}_{b1} B''^{m2+}_{b2} \ldots B^{m'\,mn+}_{bm}$ comprise $Y^{3+}$, $W^{6+}$, $Mo^{6+}$ and $Mn^{2+}$, and an additional compound, which is $SiO_2$ with $0.98 \leq a_1 + a_2 + \ldots + a_n \geq 1.02$, $0.98 \leq b_1 + b_2 + \ldots + b_m \geq 1.02$, $a_1 + a_2 + \ldots + a_n + b_1 + b_2 + \ldots + b_m \leq 2$, $a_1*n^1 + a_2*n^2 + \ldots + a_n*n^n + b_1*m^1 + \ldots b_2*2^+ + \ldots + b_m*m^m \leq 6$.

* * * * *